United States Patent
Berenshteyn et al.

(10) Patent No.: US 6,871,758 B2
(45) Date of Patent: Mar. 29, 2005

(54) PRECISION ADAPTIVE POWDER DISPENSER

(75) Inventors: Annaniy Berenshteyn, Ocean, NJ (US); Rajesh K. Maheshwari, Millburn, NJ (US)

(73) Assignee: Schering Corporation, Kenilworth, NJ (US)

(*) Notice: Subject to any disclaimer, the term of this patent is extended or adjusted under 35 U.S.C. 154(b) by 0 days.

(21) Appl. No.: 10/623,973

(22) Filed: Jul. 21, 2003

(65) Prior Publication Data

US 2004/0016767 A1 Jan. 29, 2004

Related U.S. Application Data

(60) Provisional application No. 60/397,787, filed on Jul. 22, 2002.

(51) Int. Cl.[7] .................................... G01F 11/00

(52) U.S. Cl. ........................ 222/1; 222/152; 222/354; 222/366; 222/399

(58) Field of Search ........................ 222/1, 152, 195, 222/344, 354, 361, 366, 394, 399, 444, 453

(56) References Cited

U.S. PATENT DOCUMENTS

| 4,131,219 A | * | 12/1978 | Hind et al. | 222/603 |
| 5,183,507 A | * | 2/1993 | Scherer | 118/18 |
| 5,293,757 A | * | 3/1994 | Nishio | 62/344 |
| 5,706,742 A | * | 1/1998 | Hamrick | 110/286 |
| 6,024,258 A | * | 2/2000 | D'Alterio | 222/361 |
| 6,111,206 A | * | 8/2000 | Maguire | 177/60 |
| 6,450,371 B1 | * | 9/2002 | Sherman et al. | 222/361 |

* cited by examiner

Primary Examiner—Joseph A. Kaufman
(74) Attorney, Agent, or Firm—James M. Gould

(57) ABSTRACT

A powder dispenser includes: a dispenser housing having including a hopper for holding a powder; an outlet tube; a slider slidably mounted with respect to the dispenser housing between a feed position and a dispense position, the slider including a holding member for receiving powder supplied through a dispensing opening of the hopper in the feed position, the holding member having pores which permit gas passage therethrough but which prevent powder passage therethrough, and a vacuum passage for removing gas trapped by the powder in the holding member, through the holding member wall; an angled bore for supplying a pressurized gas at an angle to the hopper to provide a swirling effect; and a gas supply bore in the dispenser housing for supplying a pressurized gas to the receptacle portion in the dispense position to force the powder from the receptacle portion to the outlet tube.

18 Claims, 9 Drawing Sheets

PRECISION ADAPTIVE POWDER DISPENSER

INTRODUCTION TO THE INVENTION

Figure 1:
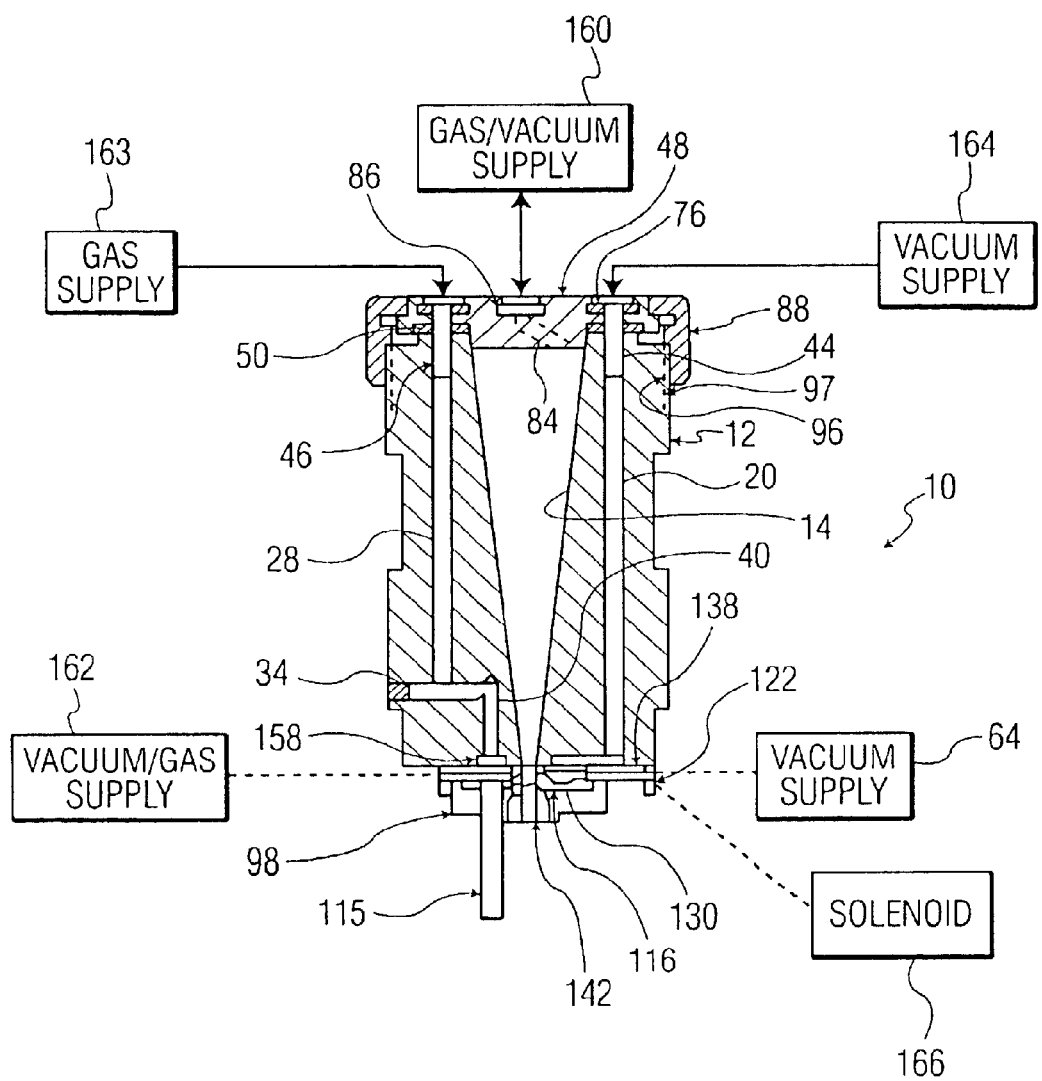
Figure 2:
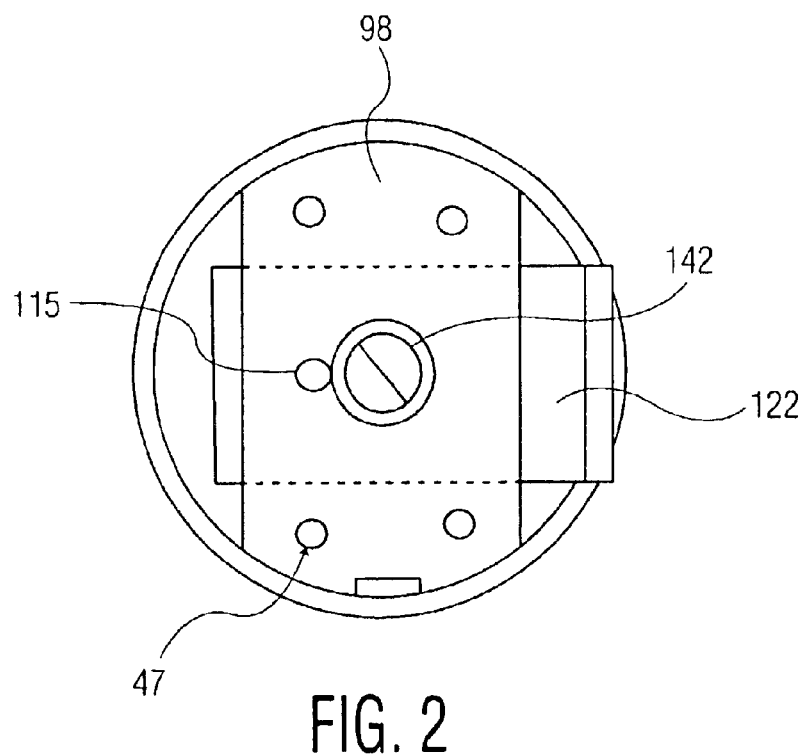
Figure 3:
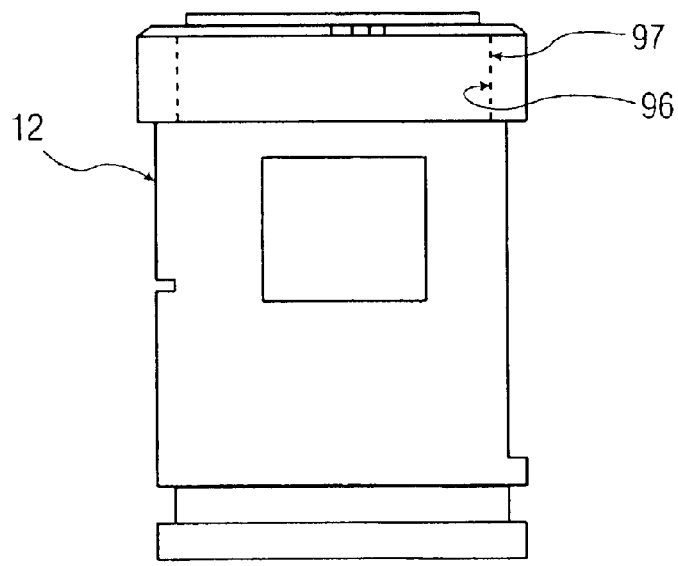
Figure 4:
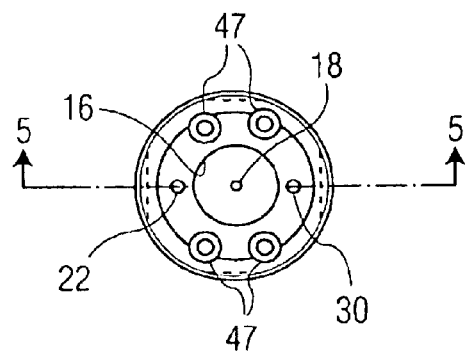
Figure 5:
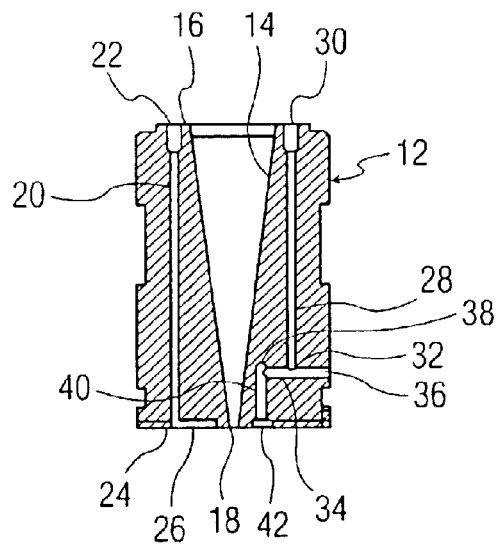
Figure 6:
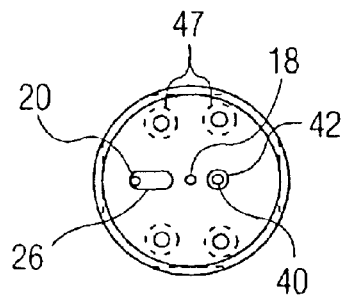
Figure 7:
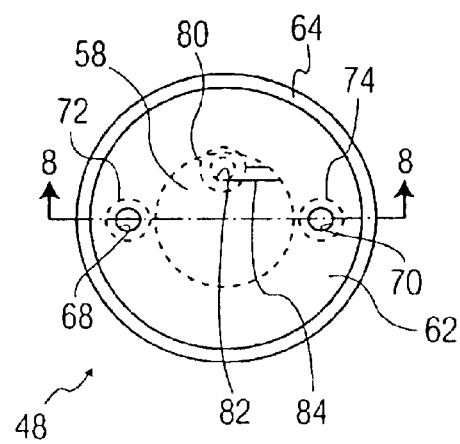
Figure 8:
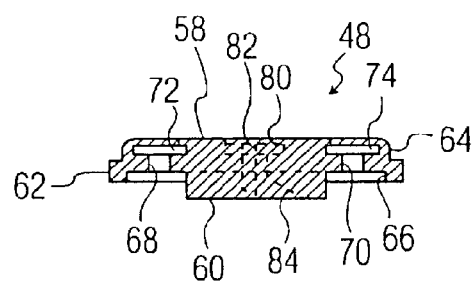
Figure 9:
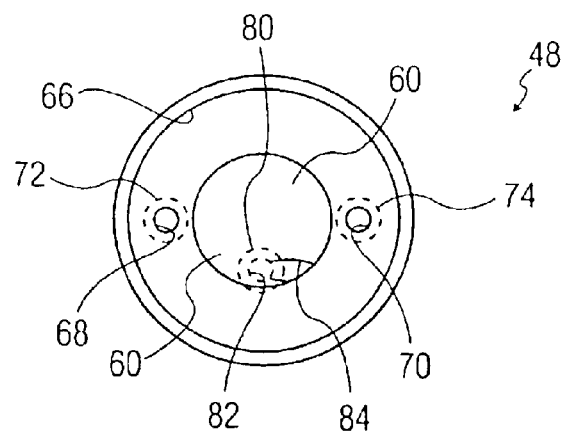

The accurate repetitive dispensing of small amounts of powdered substances is a core component of many industrial processes, such as in research and development or manufacturing. For example, in developing new pharmaceutical products it frequently is necessary to screen the activity of each synthesized chemical compound using hundreds of powdered enzymes, each of which has the ability to catalyze a desired reaction. Other processes entail the dispensing of powders into dry powder inhalers, dispensing of compounds in a compound distribution center, dispensing of particulate matrices useful for dispensing lyophilized microorganisms, dispensing of resins for combinatorial chemistry and filling of capsules, blister packages and other containers.

Dispensing small quantities of powdered substances is normally time consuming and, depending on the powder involved, can be a hazardous operation. While technology is widely available for the bulk dispensing of free-flowing powders having particle sizes greater than 0.25 inch (6.35 mm), the technology is not available for accurately dispensing milligram amounts of a very wide range of fine powders which can be stored in an isolated environment between dispensing operations.

As a consequence of the labor intensive and potentially hazardous process of manually dispensing hundreds of powdered enzymes, evaluation occurs for only a small fraction of the conditions which could potentially be studied in any process step in a pharmaceutical research operation. The limitations of a manual powder dispensing method increases the risk of not finding the best process for synthesis of desired products. In the field of biocatalysis, a large number of experiments must be staged for each reaction investigated. It has been observed by the inventors that, in at least one case, these limitations resulted in the development and scale-up of a non-optimal reaction, since a more optimal reaction was discovered later.

In this regard, a principal impediment to automating an enzyme screening process is not being able to accurately dispense a very wide range of different powders.

SUMMARY OF THE INVENTION

It is an aspect of the present invention to provide a precision adaptive powder dispenser that overcomes the aforementioned disadvantages of the prior art.

It is another aspect of the present invention to provide a precision adaptive powder dispenser that can dispense powders having a large range of physical characteristics.

It is yet another aspect of the present invention to provide a precision adaptive powder dispenser that can repetitively dispense powders in a range of about 0.1–20 mg with ±5% or better accuracy.

It is a further aspect of the present invention to provide a precision adaptive powder dispenser that operates to agitate and de-agglomerate the powders prior to and/or simultaneously with dispensing of the powders.

It is a still further aspect of the present invention to provide a precision adaptive powder dispenser that uses injected gas to agitate and de-agglomerate the powders prior to and/or simultaneously with dispensing of the powders.

It is a yet further aspect of the present invention to provide a precision adaptive powder dispenser that prevents compaction of the powders stored in the dispenser.

It is another aspect of the present invention to provide a precision adaptive powder dispenser that permits dispensing of the entire quantity of powder contained in the dispenser.

It is still another aspect of the present invention to provide a precision adaptive powder dispenser that applies a gas through a side wall of the tubular frit to disengage the powder from the side wall during dispensing.

It is yet another aspect of the present invention to provide a precision adaptive powder dispenser that applies a vacuum through a side wall of the tubular frit at the feed position to remove any injected gas trapped in the tubular frit by the powder.

In accordance with an embodiment of the present invention, a powder dispenser includes a dispenser housing including a cavity for holding a supply of a powder, the cavity having a dispensing opening; an outlet supply tube fixed relative to the dispenser housing and in fluid communication with a gas supply bore; a slider slidably mounted with respect to the dispenser housing between a feed position and a dispense position, the slider including a receptacle portion for receiving the powder supplied from the cavity through the dispensing opening when the slider is in the feed position and for supplying the received powder to the outlet supply tube when the slider is in the dispense position, the receptacle portion including a holding member having pores which permit passage of a gas therethrough but which prevent passage of the powder therethrough, and a vacuum passage in fluid communication with an outer wall of the holding member to remove gas trapped by the powder in the holding member; an arrangement for supplying a pressurized gas to the cavity; and a gas supply bore in the dispenser housing for supplying a pressurized gas to the receptacle portion when the slider is in the dispense position so as to force the powder from the receptacle portion to the outlet supply tube.

The arrangement for supplying a pressurized gas includes a device for supplying the pressurized gas at an angle to the cavity to provide a swirling effect of the powder in the cavity. Specifically, the device includes an angled bore at an upper end of the dispenser housing for supplying the pressurized gas at an angle to the cavity. Preferably, the angle is approximately 60° to a vertical. The cavity includes a supply opening for supplying new powder to the cavity, and further comprising a removable cap secured to the supply opening, the arrangement being provided in the removable cap.

The cavity includes a substantially conically shaped hopper having the dispensing opening at a lower open end thereof. A slider housing is secured to the dispenser housing for slidably supporting the slider between the feed position and the dispense position, the slider housing including an outlet opening between the gas supply bore and the outlet supply tube. The slider housing also includes a vent opening in alignment with the dispensing opening, and a mesh insert is provided in the vent opening and has mesh openings that permit escape of gas therethrough but which prevent the escape of powder therethrough. Preferably, the mesh insert includes a mesh plug having a through bore, and a mesh sheet mounted to the mesh plug in covering relation to the through bore, with the mesh plug being positioned in the vent opening.

Also, a first gasket is positioned between the dispenser housing and the slider, and a second gasket is positioned between the slider and the slider housing to prevent escape of powder. The slider includes a recess facing the slider housing and a vacuum passage in fluid communication with the recess for applying a vacuum to the recess to remove powder on the slider housing.

In accordance with another embodiment of the present invention, a method for dispensing predetermined amounts of powder from a powder dispenser includes the steps of providing powder to be dispensed in a cavity of a dispenser housing which has a dispensing opening for the cavity; moving a slider to a feed position relative to the dispenser housing such that a holding member of the slider which has pores that permit passage of a gas therethrough but which prevent passage of the powder therethrough is supplied with powder from the dispensing opening for the cavity to the holding member; providing the following cycle of steps at least once until the holding member is precisely filled with a predetermined amount of the powder: supplying a pressurized gas to the cavity to aid in delivery of the powder from the cavity to the holding member; stopping the supply of the pressurized gas to the cavity; applying a vacuum through a vacuum passage in fluid communication with an outer wall of the holding member to remove gas trapped by the powder through the holding member; moving the slider to a dispense position relative to the dispenser housing such that the holding member of the slider is positioned over an outlet supply tube fixed relative to the dispenser housing; and supplying a pressurized gas to the receptacle portion through a gas supply bore in the dispenser housing so as to force the powder from the receptacle portion to the outlet supply tube.

Figure 10:
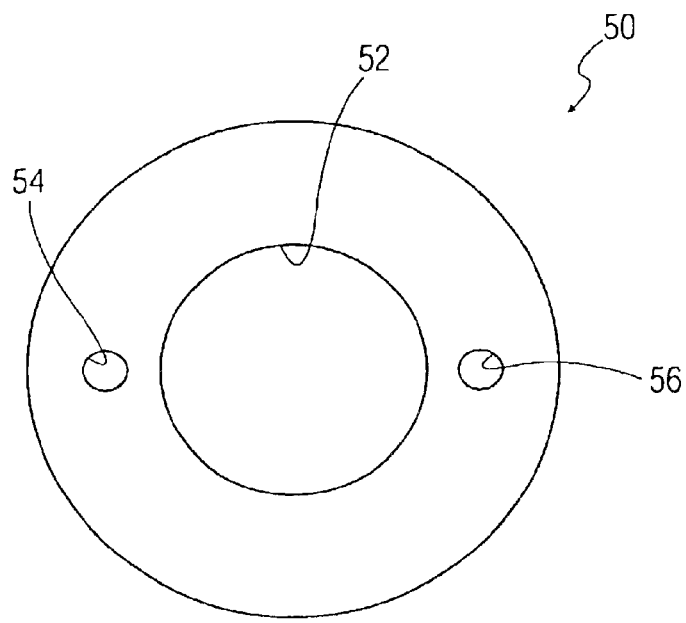
Figure 11:
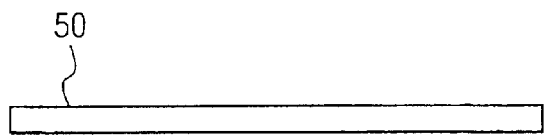

The above and other embodiments, features and advantages of the invention will become readily apparent from the following detailed description, which is to be read in connection with the accompanying drawings.

BRIEF DESCRIPTION OF THE DRAWINGS

FIG. 1 is a cross-sectional view of a precision adaptive powder dispenser according to the present invention;

FIG. 2 is a bottom plan view of the precision adaptive powder dispenser of FIG. 1;

FIG. 3 is an elevational view of the dispenser housing;

FIG. 4 is a top plan view of the dispenser housing;

FIG. 5 is a cross-sectional view of the dispenser housing of FIG. 4, taken along line 5—5 thereof;

FIG. 6 is a bottom plan view of the dispenser housing;

FIG. 7 is a top plan view of the cap;

FIG. 8 is a cross-sectional view of the cap of FIG. 7, taken along line 8—8 thereof;

FIG. 9 is a bottom plan view of the cap;

FIG. 10 is a plan view of the cap gasket;

FIG. 11 is an elevational view of the cap gasket;

FIG. 12 is a cross-sectional view of the cap;

FIG. 13 is a top plan view of the slider housing;

FIG. 14 is a cross-sectional view of the slider housing of FIG. 13, taken along line 14—14 thereof;

FIG. 15 is a plan view of the slider housing gasket;

FIG. 16 is an elevational view of the slider housing gasket;

FIG. 17 is a top plan view of the slider;

FIG. 18 is a cross-sectional view of the slider of FIG. 17, taken along line 18—18 thereof;

FIG. 19 is a bottom plan view of the slider;

FIG. 20 is a left side elevational view of the slider;

FIG. 21 is a right side elevational view of the slider;

FIG. 22 is a plan view of the slider gasket;

FIG. 23 is an elevational view of the slider gasket;

FIG. 24 is a cross-sectional view of the porous tubular frit; and

FIG. 25 is a cross-sectional view of the mesh plug assembly.

DETAILED DESCRIPTION

Referring to the drawings, a precision adaptive powder dispenser 10 according to the present invention includes a dispenser housing 12 having a generally cylindrical configuration, although the present invention is not limited to this specific embodiment. Dispenser housing 12 includes a cavity in the form of a conically shaped hopper 14 that extends from an upper open end 16 to a lower open end 18.

Dispenser housing 12 further includes a vacuum bore 20 extending lengthwise through dispenser housing 12 from an open upper end 22 to an open lower end 24, with the open lower end 24 having a 90 degree turn to form a lower oval recess 26 which extends toward, but spaced slightly from, lower open end 18 of conically shaped hopper 14. Dispenser housing 12 also includes a gas supply bore 28 extending lengthwise through dispenser housing 12 in diametrically opposite relation to vacuum bore 20, from an open upper end 30 to an open lower end 32. The lower open end 32 opens into a radially oriented bore 34 which is closed at its radially outer end by a plug 36 and which has a radially inner end 38 that opens into the upper end of a lower lengthwise extending bore 40 having an enlarged circular lower open end 42. In this manner, as will be understood from the discussion hereinafter, gas is selectively supplied under pressure through bores 28, 34 and 40, and a vacuum is applied through bore 20, the purposes for which will become apparent from the discussion which follows.

Any pressurized gas is suitable for use in the invention. In general, the identity of the gas will depend upon the reactivity of the powder to be dispensed, as the gas preferably should not react with or otherwise alter the chemical or physical characteristics of the powder which is to be dispensed. For reasons of economy and ready commercial availability, the chosen gas frequently will be dry nitrogen. However other gases are suitable, including without limitation carbon dioxide or argon, or, if the powder is sufficiently chemically inert, compressed air.

The upper ends 22 and 30 of bores 20 and 28 are of a larger diameter than the remainder of bores 20 and 28. Short tubular housing inserts 44 and 46 are inserted in the larger diameter upper ends 22 and 30 of bores 20 and 28 and have inner diameters which are the same as the remainder of bores 20 and 28 so as to provide smooth constant diameter bore holes through the entire length of dispenser housing 12. Further, tubular housing inserts 44 and 46 are of a greater length than the larger diameter upper ends 22 and 30 of bores 20 and 28 so as to extend up out of dispenser housing 12, as shown best in FIG. 1.

Four through bores 47 are also provided in dispenser housing 12, their purpose becoming apparent from the discussion hereafter.

As will be discussed in more detail hereinafter, powder is dispensed based on a volumetric scheme. Specifically, the powder is forced from hopper 14 into a fixed volume cavity, and the fixed volume cavity is then transferred to a position where the contents are transferred into a sealed microtiter plate.

A cap 48 is secured by dispenser housing nut 88 on the upper end of housing 12, in covering relation to upper open end 16 of hopper 14, open upper end 22 of vacuum bore 20 and open upper end 30 of gas supply bore 28. In order to provide an air tight seal, a cap gasket 50 is positioned between cap 48 and the upper edge of dispenser housing 12. As shown in FIGS. 10 and 11, cap gasket 50 is provided with a large central opening 52 which corresponds to upper open end 16 of hopper 14, and first and second diametrically opposite smaller openings 54 and 56 which correspond to open upper end 22 of vacuum bore 20 and open upper end 30 of gas supply bore 28, respectively. Cap gasket 50 can be made of any suitable material, for example, a one-sixteenth inch (1.6 mm) thick, high grade neoprene rubber with a 50 durometer hardness.

As shown best in FIGS. 1 and 7–9, cap 48 includes a central section 58 with a downwardly extending boss 60 and an annular section 62 surrounding central section 58 and integrally formed therewith as a one-piece unit. Annular section 62 is cut away at the upper, outer portion thereof to form an upper annular shoulder 64, and is cut away at the lower end thereof between central section 58 and annular shoulder 64 to form a lower annular recess 66 which receives cap gasket 50. Two diametrically oriented openings 68 and 70 are provided in annular section 62 and spaced inwardly from annular shoulder 64, with openings 68 and 70 being in alignment with openings 54 and 56 of cap gasket 50. In this regard, short tubular housing inserts 44 and 46 extend from dispenser housing 12, through openings 54 and 56 of cap gasket 50 and into openings 68 and 70 of cap 48. The upper ends of openings 68 and 70 have enlarged diameter portions 72 and 74 for receipt of gas gaskets 76 therein. Gas gaskets 76 have a central opening as shown in FIG. 1 to permit the flow of gas through openings 68 and 70.

Central section 58 of cap 48 further includes an enlarged central disc-like bore 80 near the upper end that leads into a downwardly extending smaller diameter bore 82. The lower end of opening 82 leads into an angled bore 84 in boss 60 that is open at the lower end of boss 60. Angled bore 84 can extend at any suitable angle to the vertical, but preferably extends an angle of 60 degrees to the vertical. In this manner, as will be understood from the discussion hereafter, a gas introduced through angled bore 84 will impinge on the conical wall of hopper 14 to provide a vortex. A cap frit 86 is positioned in disc-like bore 80 and can be, for example, a 0.025 inch (0.6 mm) thick polyethylene T3 bacteria sheet sold by Porex Corporation of Fairbum, Ga. U.S.A. Cap frit 86 prevents the loss of powder during the vacuum cycle, as will be understood from the discussion hereafter.

Figure 12:
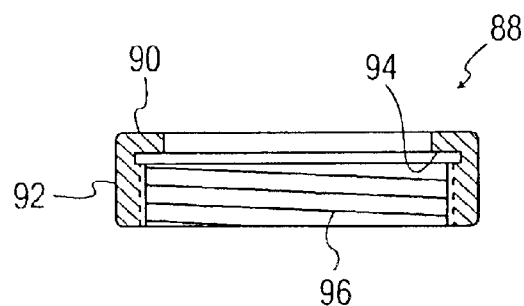
Figure 13:
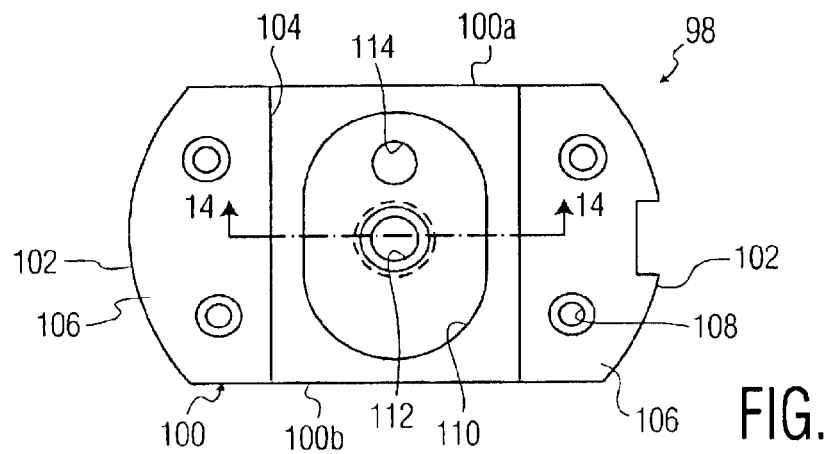
Figure 14:
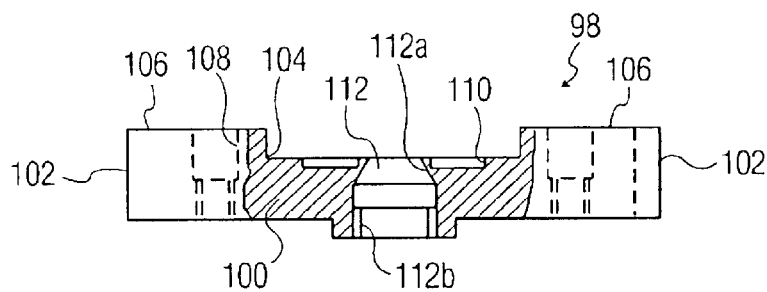

Cap 48 is secured to the upper end of dispenser housing 12 by a plastic dispenser housing nut 88, as best shown in FIGS. 1 and 12. Dispenser housing nut 88 includes an annular upper disc section 90 with a downwardly extending annular skirt 92 formed at the outer periphery of annular upper disc section 90. In this manner, a lower facing annular shoulder 94 is formed at the lower, outer face of annular upper disc 90. The inner wall of skirt 92 is formed with threads 96 for engaging with threads 97 on the outer surface of dispenser housing 12. When dispenser housing nut 88 is threadedly secured to dispenser housing 12, shoulder 94 engages and clamps down on upper annular shoulder 64 of cap 48 so as to releasably secure cap 48 on dispenser housing 12.

As shown in FIGS. 1, 2, 13 and 14, a slider housing 98 is secured to the lower face of dispenser housing 12. Slider housing 98 includes a generally rectangular block 100 having opposite arcuate edges 102. A rectangular recessed section 104 is formed in the upper surface of block 100 between arcuate edges 102, thereby forming raised landings 106 between recessed section 104 and arcuate edges 102. Each raised landing 106 includes two threaded bore holes 108 extending therethrough, with threaded bore holes 108 being in alignment with through bores 47 of dispenser housing 12 when slider housing 98 is positioned to the lower surface of dispenser housing 12, whereby bolts (not shown) are provided through bores 47 and are secured in threaded bore holes 108 so as to secure slider housing 98 to the lower face of dispenser housing 12.

An oval shaped recessed section 110 is formed in the upper surface of recessed section 104. A vent opening 112 is formed centrally in oval shaped recessed section 110 and a dispense bore 114 is formed offset to one side in oval shaped recessed section 110. Vent opening 112 includes an upper portion 112a which has an inverted frusto-conical taper, and which meets with a lower cylindrical portion 112b. Vent opening 112 is in axial alignment with lower open end 18 of hopper 14, while dispense bore 114 is in axial alignment with gas supply bore 28 of dispenser housing 12. A nozzle or supply tube 115 is fitted within dispense bore 114 and extends down from slider housing 98 for dispensing the powder from precision adaptive powder dispenser 10.

Figure 15:
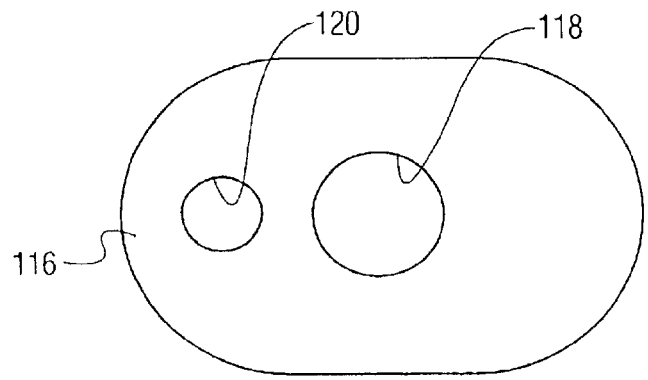
Figure 16:
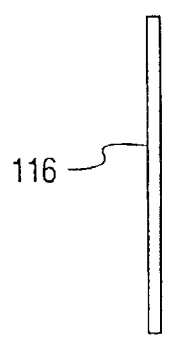
Figure 17:
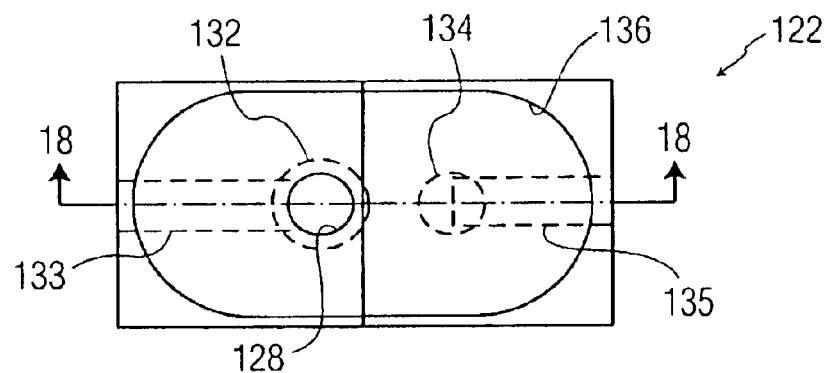
Figure 18:
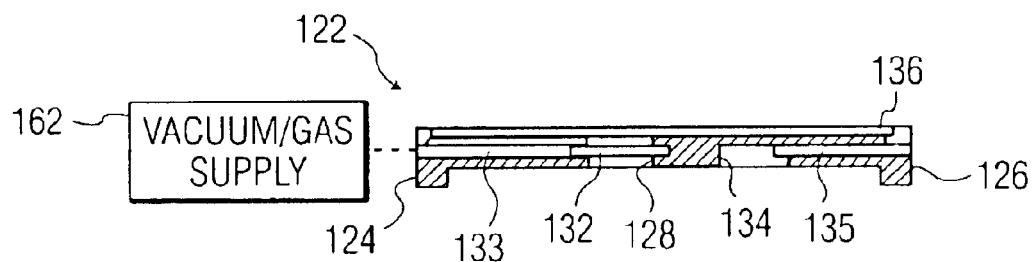
Figure 19:
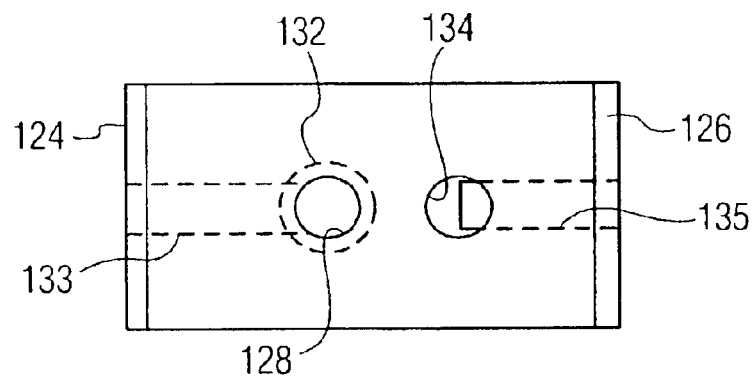
Figure 20:
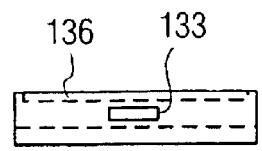
Figure 21:
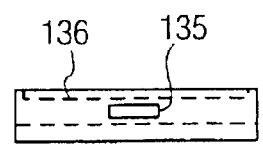
Figure 22:
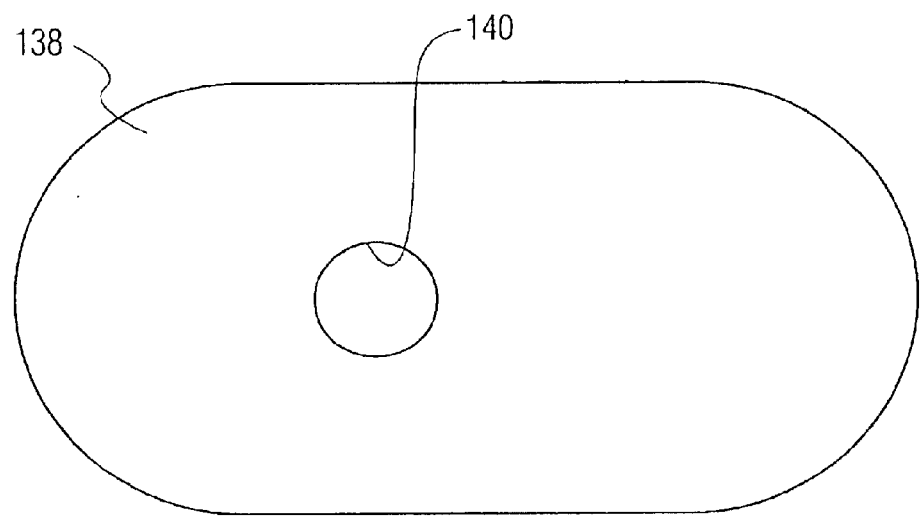
Figure 23:
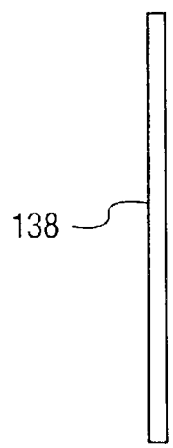

A slider housing gasket 116, as shown in FIGS. 1, 15 and 16, is positioned in oval shaped recessed section 110. In this regard, slider housing gasket 116 has the same dimensions and shape as oval shaped recessed section 110 and can be made from any suitable material, such as a one-sixteenth inch (1.6 mm) thick polytetrafluoroethylene joint sealant material sold by W. L. Gore & Associates of Flagstaff, Ariz. U.S.A. under the trademark "GORE-TEX." Slider housing gasket 116 has a central opening 118 that is in alignment with vent opening 112 and a spaced apart, adjacent opening 120 that is in alignment with dispense bore 114.

Referring now to FIGS. 1 and 17–21, a rectangular slider 122 is slidably mounted in recessed section 104 of slider housing 98, that is, between the lower face of dispenser housing 12 and slider housing gasket 116 mounted on slider housing 98. In this regard, opposite ends of slider 122 include a first downwardly extending stop 124 which hangs over one transverse edge 100a of block 100 of slider housing 98 and a second downwardly extending stop 126 which hangs over the opposite transverse edge 100b of block 100 of slider housing 98 in order to limit the extent of sliding movement of slider 122 relative to slider housing 98.

Figure 24:
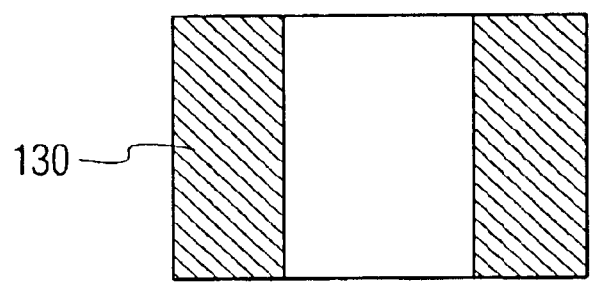

Slider 122 includes a through bore 128 which can selectively be positioned beneath vent opening 112 or dispense bore 114, by sliding movement of slider 122. A porous tubular frit 130, as shown in FIGS. 1 and 24, is mounted in through bore 128, and the powder from hopper 14 fills porous tubular frit 130. The cylindrical wall of porous tubular frit 130 includes frit pores less than 10 $\mu$m in size, for example, of 7 $\mu$m size, thus allowing gases to escape from tubular frit 130, but preventing the escape of powder through the cylindrical wall thereof. A suitable tubular frit 130 is a 0.125 inch (3 mm) thick polyethylene sheet with pores of 10 $\mu$m size which can be obtained from Porex Technologies of Fairburn, Ga. U.S.A. The wall thickness of porous tubular frit 130 in slider 122 is preferably reduced by a machining process to allow tolerances to be placed on the dimensions of tubular frit 130, while at the same time, the reduced wall thickness reduces the restriction to gas flow through the annular wall of tubular frit 130.

An annular recess 132 is provided in surrounding relation to through bore 128 and porous tubular frit 130, and a transverse vacuum passage 133 extends from annular recess 132 to an outside of slider 122, the purpose for which will be understood from the discussion hereafter. Slider 122 further includes a cylindrical recess 134 at the underside in spaced relation to through bore 128, and a vacuum passage 135 extends from cylindrical recess 134 to an outside of slider 122, the purpose for which will be understood from the discussion hereafter.

In addition, an upper oval shaped recessed section 136 is provided in the upper surface of slider 122, and a slider gasket 138 having the same shape and dimensions as oval shaped recessed section 136 is mounted therein. Slider gasket 138 can be made from any suitable material, such as the one-sixteenth inch (1.6 mm) thick expanded polytetrafluoroethylene joint sealant material sold under the trademark "GORE-TEX." Slider gasket 138 has an opening 140 in alignment with vent opening 112 in the feed position and in alignment with dispense bore 114 in the dispense position of slider 122.

Figure 25:
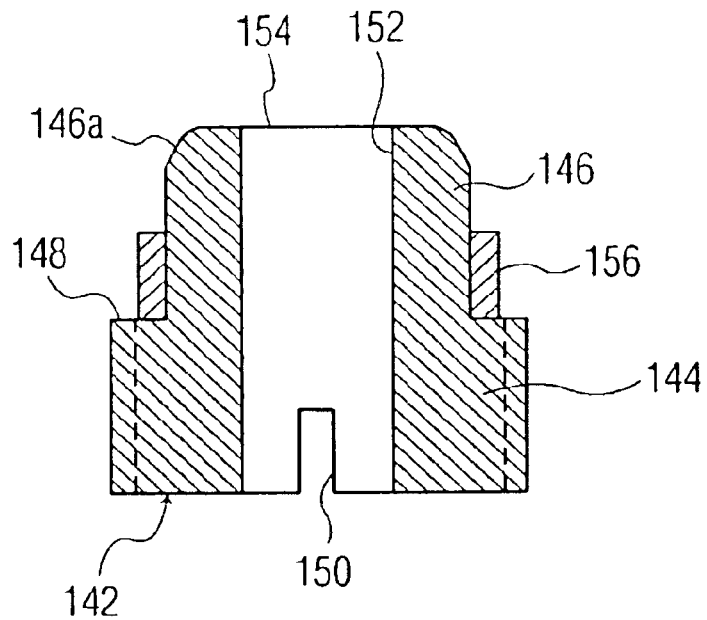

Referring to FIG. 25 a mesh plug 142 is fit within vent opening 112 from the underside of slider housing 98. Mesh plug 142 includes a lower tubular section 144 of a first diameter and an upper tubular section 146 of a lesser diameter and integrally formed with lower tubular section 144 as a one-piece unit. Accordingly, an annular shoulder 148 is formed between tubular sections 144 and 146. Lower tubular section 144 fits snugly with a friction fit within lower cylindrical portion 112*b* of vent opening 112, while the upper beveled edge 146*a* of upper tubular section 146 contacts upper portion 112*a* of vent opening 112. A slot 150 is provided in lower tubular section 144 by which a screwdriver or other tool can be inserted for removing mesh plug 142 from vent opening 112. Mesh plug 142 also includes a central axial bore 152 therethrough.

A flexible mesh sheet 154 is tightly stretched over the upper open end of upper tubular section 146 of mesh plug 142 and extends around the outer side wall thereof. For example, a nylon net mesh filter having, for example, 0.1 μm openings and sold by Millipore Corporation of Bedford, Mass. U.S.A. can be used for mesh sheet 154. A cylindrical mesh plug insert 156 is force fit over upper tubular section 146 to secure mesh sheet 154 in a tight fitting arrangement on mesh plug 142. It will be appreciated that, when mesh plug 142 is fit within vent opening 112, mesh sheet 154 is positioned only a few tenths of a μm below the upper surface of slider housing 98 to reduce the wear on mesh sheet 154. Mesh sheet 154 permits gases to escape but prevents the escape of powder. Thus, the powder in hopper 14 is prevented from leaking out into the environment.

Depending on the particle sizes of the powders to be dispensed, the mesh opening sizes can be chosen either smaller or larger than 0.1 μm. In general, the openings should be sufficiently small to prevent powder particles from passing through.

Lastly, a blast pressure frit 158 is mounted in enlarged circular lower open end 42 of dispenser housing 12. Blast pressure frit 158 is a polyethylene sheet filter having a thickness of 0.0625 inches (1.6 mm) and openings in the range of 15 μm to 45 μm, manufactured by Porex Technologies of Fairbum, Ga. U.S.A.

With reference to the above representative construction details, the operation and advantages achieved by the present invention will now be discussed.

Powder from hopper 14 is used to fill porous tubular frit 130 in slider 122. However, a key aspect to successfully dispensing the powder is to get the powder to flow along the walls of hopper 14. Conventionally, in industry, the geometry and the orifice opening of a hopper is customized for a given powder/particle size. Also, in conventional constructions, the powders are generally exposed to the environment, which may be unacceptable. For example, enzyme powders can cause allergic reactions, and in some cases these reactions can be quite severe. Also, the powder characteristics can vary considerably. Differences in properties such as particle size, specific gravity and shape, particle binding characteristics, affinity to electrostatic charge, flowablity, compressibility and permeability make the control of powder flow difficult.

The present invention provides for optimal powder flow along the walls of conically shaped hopper 14. This is accomplished by inducing a vortex in conically shaped hopper 14 during pressure-vacuum cycles. This reduces the surface friction by providing an air cushion, and at the same time sucks the powder down into tubular frit 130. This is the purpose of angled bore 84 in cap 48. Preferably, a pressurized gas is introduced from a gas/vacuum supply 160 through angled bore 84 to create the vortex flow. Thus, the gas enters at an angle and thereby is caused to create a vortex in hopper 14 which swirls and fluidizes the powder in the hopper.

The volume of conically shaped hopper 14 can be set as desired, although a preferable volume is one which is sufficient to deliver 500 shots or fills of tubular frit 130. The volume of each shot is determined by the volume of tubular frit 130. However, it is preferable, to ensure optimal flow, to determine optimal cone geometry of hopper 14. Optimal geometry permits free flow of powders along the walls, and prevents a stable arch from building across the orifice at lower open end 18. To maximize flow, the tangential force along the wall of the cone due to the weight of the powder has to be maximized. This is computed using the following equation:

$$\text{Total } F_t = \int \{\cos[\arctan(\partial f(x)/\partial x)][2\pi r + 2\pi \partial r] F'_{cs}\} \partial r$$

In which:

$F_t$=tangential component of the force, f(x)=the function that describes the shape of the cone, $F'_{cs}$=force per unit length along the circumference of an elemental cylinder of powder, and r=radius of the cone at a given section height.

The integral is in cylindrical coordinates so the derivative of f(x) must be converted to cylindrical coordinates before it can be calculated. The optimal nozzle has the tangential component of the force maximized. In order to do this, it is necessary to set the derivative of Total $F_t$ equal to zero, and then solve for f(x). A conical shape of hopper 14 with linear, rather than curved, walls has been determined to be optimal from calculations made on the forces exerted on the powder mass by the walls of conically shaped hopper 14.

A problem that can occur is that the orifice at lower open end 18 of hopper 14 may be too small for some powders to pass through, causing incomplete filling of the tubular frit 130 in slider 122. Powders will then form a bridge in hopper 14 that may not be broken by the pressure of the gas from gas supply 160. For example, diatomaceous earth has always been difficult to dispense due to the nature of its interlocking particles which agglomerate easily. Optimal orifice diameter at lower open end 18 was determined for dispensing diatomaceous earth powder having particle sizes between 5 and 20 $\mu$m by increasing the diameter in small increments, and experimentally dispensing powders. This iteration was done until all of the powder was satisfactorily dispensed. Table I provides a summary of the results, where the small orifice had a diameter of 0.088 inch (2.24 mm) and the large orifice had a diameter of 0.100 inch (2.54 mm). As expected, the weight of dispensed powders increased with the increase in the orifice diameter.

TABLE 1

|  | No. of Powders With Small Orifice | % of Total Powders | No. of Powders With Large Orifice | % of Total Powders |
| --- | --- | --- | --- | --- |
| 0–5 mg | 14 | 23.33% | 6 | 10.00% |
| 5–8 mg | 18 | 30.00% | 14 | 23.33% |
| 8–10 mg | 15 | 25.00% | 10 | 16.67% |
| 10–13 mg | 9 | 15.00% | 15 | 25.00% |
| 13–25 mg | 4 | 6.67% | 15 | 25.00% |
| Total | 60 |  | 60 |  |

In addition, an acetal homopolymer material sold by E. I. du Pont de Nemours and Company of Wilmington, Del. U.S.A. under the trademark DELRIN is a useful material to form the conical wall of hopper 14 because it is easy to machine, has a very low coefficient of friction, and is not very susceptible to electrostatic charges.

However, because pressurized gas is supplied, a problem can occur that the gas becomes trapped in the powder in the filled tubular frit 130. Specifically, as the powder is forced out of hopper 14 into tubular frit 130, the trapped gas compresses, and this makes it more difficult to fill tubular frit 130. As a result, tubular frit 130 may not be correctly filled. Therefore, it is necessary to rapidly and completely evacuate the trapped gas. In this regard, the frit pores are less then 10 $\mu$m, thus allowing the gases to escape but preventing escape of the powder. The gas is then evacuated by a vacuum/gas supply 162 which applies a vacuum through vacuum passage 133. At the same time, the vacuum functions to pull in the powder from hopper 14 to fill tubular frit 130. By using a vacuum with tubular frit 130, there is significant qualitative improvement in getting the powder from conically shaped hopper 14 to tubular frit 130, that is, loading the powder into tubular frit 130 is more even, efficient and repeatable.

In addition, disposable mesh plug 142 with flexible mesh sheet 154 in slider housing 98 is positioned below tubular frit 130, to further enhance removal of the gas from tubular frit 130. There is virtually no pressure drop across mesh sheet 154. Further, tests have shown that the useful life of mesh sheet 154 can be between 2000 and 4000 dispensing operations. Thus, a user can easily replace the mesh plug assembly using a small screwdriver in slot 150.

It will be appreciated that disposable mesh plug 142 prevents the escape of powder into the environment. In addition, cap frit 86 provides the same function at the upper end of hopper 14 during the vacuum cycle. To further prevent the escape of powders, slider housing gasket 116 and slider gasket 138 are provided, which conform to the contact surfaces of the dispenser parts, and thereby cover a large area of the contact surfaces, thus making sealing more efficient. Lastly, although not shown, in order to further reduce powder leakage, a gasket tensioning system is provided by springs (not shown) that apply a constant tension to the bolts extending through bores 47 and which hold slider housing 98 to dispenser housing 12, thereby pulling slider housing 98 towards dispenser housing 12, and in the process, compressing slider 122 and gaskets 116 and 138 between them. Thus, the springs are able to compensate for thickness decreases due to wearing away of gaskets 116 and 138.

As a secondary measure of sealing in powder, the present invention uses a cleaning system in the form of cylindrical recess 134 connected by vacuum passage 135 to a vacuum supply 164. When slider 122 is moved to the dispense position such that through bore 128 is positioned over dispense bore 114, recess 134 is centered over vent opening 112 and mesh sheet 154, and the applied vacuum drawn through vacuum passage 135 functions as a vacuum cleaner for mesh sheet 154 and for any powder inadvertently scraped onto slider housing gasket 116, removing any residual powder.

The cleaning system also provides for a vacuum to be applied by a gas/vacuum supply 160 through vacuum bore 20 of dispenser housing 12 to remove any residual powder on slider gasket 138.

In operation, cap 48 is unscrewed and hopper 14 is filled with a powder to be dispensed, sufficient for a plurality of dispensing operations such as 500 shots. Cap 48 is then replaced and the gas/vacuum connection is made between gas/vacuum supply 160 and cap 48. At the start, tubular frit 130 is positioned below lower open end 18 of hopper 14. Then, gas/vacuum supply 160 is activated to introduce gas at an angle into hopper 14. This gas impacts the side wall of conical hopper 14 at an angle and creates a vortex, thereby also reducing friction of the powder with the conical wall of hopper 14, to provide better flow of the powder through lower open end 18 into tubular frit 130. As a result, the powder is fluidized in that it slides along the side wall into tubular frit 130. At this time, gas becomes trapped in tubular frit 130 with the powder. Therefore, after a short time interval, the supply of gas is stopped, and a vacuum is applied both from gas/vacuum supply 160 and vacuum/gas supply 162. The vacuum from vacuum/gas supply 162 functions to remove the gas through the porous tubular frit 130, and the vacuum from gas/vacuum supply 160 functions to de-agglomerate the powder in hopper 14. Because of cap frit 86, the powder cannot escape through cap 48. Then, the vacuums are stopped, and the supply of gas from gas/vacuum supply 160 is repeated. This process will continue for about one to three cycles, depending upon the powder that is used, with the final step in the process generally being the supply of gas from gas/vacuum supply 160.

After tubular frit 130 has been packed with the powder such that the gas has been removed therefrom, slider 122 is pushed by solenoid 166 such that tubular frit 130 is positioned over dispense bore 114. In this regard, it will be appreciated that there is only one moving part in powder dispenser 10, namely, slider 122, which carries the powder from the feed position under conical hopper 14 to the dispense position away from conical hopper 14 and over dispense bore 114. By keeping the travel of slider 122 in a straight line, the dose is more efficiently sealed and powder is not lost during the dispense cycle. This greatly improves the accuracy of the doses. Slider 122 can be moved from one position to the other by locating two of solenoids 166 on either side of the slider, or by using a single solenoid that can cause reciprocating movement of the slider.

Suitable solenoids 166 can be of any type, such as pneumatic, hydraulic or electrical, or can be eliminated and the slider moved manually. However, it typically will be desired to automate the dispensing process for improved dispensing accuracy and high production rates, and a controllable solenoid will facilitate the coordination of slider movement with appropriate pressure and vacuum applications. In some manufacturing operations, such as capsule filling, it may be necessary to dispense more than one increment of powder into a container.

Gas under pressure, from gas supply 163, is then applied through opening 68 in cap 48, bores 28, 34 and 40 and blast pressure frit 158, which forces the powder out of porous tubular frit 130 into nozzle 115. Blast pressure frit 158 prevents the powder from backing up into dispenser housing 12 due to the back pressure that results when the supply of gas is stopped. However, before and/or simultaneously with gas pressure being applied from the top of the tubular frit 130, it is also applied through the side wall of tubular frit 130 because of the porous nature thereof. In this regard, during the dispensing operation, vacuum/gas supply 162 supplies gas under pressure through tubular frit 130 so that the powder is pushed away from the wall of tubular frit 130. This ensures that all powder is dispensed.

In addition, at this time, a vacuum is applied by vacuum supply 164 to cylindrical recess 134 through vacuum passage 135 to vacuum and thereby remove any residual powder on mesh sheet 154 and any powder inadvertently scraped onto slider housing gasket 116. At the same time, a vacuum is applied by gas/vacuum supply 160 through vacuum bore 20 of dispenser housing 12 to remove any residual powder on slider gasket 138.

Slider 122 is maintained in the dispensing position after the exhaust gas is shut off to evacuate the pressure in the sealed receiving vessel. This pressure in the receiving vessel ensures that all the powder dispensed is collected at the bottom of the vessel. Thus, when liquid is added for downstream processing to the receiving vessel, all of the powder is in a position to go into solution or suspension, as the case may be.

The various gas and vacuum timings are predetermined in a process called powder characterization, and these timings are preferably stored in a computer database. It is also preferred that the computer is used to control the applications of gas/vacuum supply 160, vacuum/gas supply 162 and vacuum supply 164 to dispenser housing 12, and to control solenoid 166 which causes sliding movement of slider 122, so that a programmed amount of powder is evacuated from nozzle 115 to a receiving vessel.

The total time, $t_t$, required by the dispenser to produce one dose is calculated by the following equation:

$$t_t = t_{sm} + N_c(t_{vo} + t_{vp} + t_{po} + t_{pp}) + t_{pd} + t_{sm} + t_{bd} + t_{bp} + t_{sm}$$

in which:

$t_{sm}$=the allotted time for slider 122 to move,
$N_c$=the number of pressure/vacuum cycles used to dispense a given powder,
$t_{vo}$=the time the vacuum is applied in conical hopper 14,
$t_{vp}$=the pause time allotted between vacuum and pressure,
$t_{po}$=the time that pressure is applied to conical hopper 14,
$t_{pp}$=the pause allotted between pressure and vacuum,
$t_{pd}$=the time allowed for the pressure in hopper 14 to return to atmospheric pressure before moving slider 122,
$t_{bd}$=the delay time between when gas is applied through the side of frit 130 in slider 122 and from the top of frit 130, and
$t_{bp}$=the time the dispense pressure is applied.

Variables not factored in the above equation are gas pressures and the intensity and duration of vibration, if external vibration should be required to more accurately dispense a given powder.

Powder dispenser 10 can be used in an automated process which robotically positions the dispenser in a desired spatial relationship with receiving vessels. Alternatively, powder dispenser 10 can be placed in a fixed position and the receiving vessels successively moved into position by mechanical means for receiving predetermined amounts of a powder.

With the present invention, a universal powder dispenser 10 is provided which can dispense a very wide range of powders in the 0.1–20 mg range with at least ×5% accuracy. Hazardous powders can be safely dispensed. Powder dispenser 10 keeps the powders isolated from the environment, facilitating the dispensing of reactive or toxic materials. Further, a filled powder dispenser 10 can be kept in refrigerated storage, then be brought out as desired and used to dispense powders.

This dispenser/dispensing technology can be used to reduce cycle time and increase compliance in several areas, including but not limited to: accurately dispensing powder charges into a dry powder inhaler; dispensing of compounds in a compound distribution center; dispensing of particulate matrices useful for dispensing lyophilized microorganisms; and dispensing resins for combinatorial chemistry. In a manufacturing environment, reproducible amounts of powder can be filled into containers such as capsules or blister packages.

Having described specific embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A powder dispenser comprising:
    a dispenser housing including a cavity for holding a supply of a powder, the cavity having a dispensing opening;
    an outlet supply tube fixed relative to the dispenser housing and in fluid communication with a gas supply bore;
    a slider slidably mounted with respect to said dispenser housing between a feed position and a dispense position, said slider including:
        a receptacle portion for receiving the powder supplied from said cavity through said dispensing opening when said slider is in said feed position and for supplying the received powder to said outlet supply tube when said slider is in said dispense position, said receptacle portion including a holding member having pores which permit passage of a gas therethrough but which prevent passage of the powder therethrough; and
        a vacuum passage in fluid communication with an outer wall of said holding member to remove gas trapped by said powder through said holding member;
    an arrangement for supplying a pressurized gas to said cavity; and
    the gas supply bore in said dispenser housing supplies a pressurized gas to the receptacle portion when said slider is in said dispense position so as to force the powder from said receptacle portion to said outlet supply tube.

2. The powder dispenser according to claim 1, wherein said arrangement for supplying a pressurized gas includes a device for supplying the pressurized gas at an angle to said cavity to cause swirling of the powder in said cavity.

3. The powder dispenser according to claim 2, wherein said device includes an angled bore at an upper end of said dispenser housing for supplying the pressurized gas at an angle to said cavity.

4. The powder dispenser according to claim 2, wherein said angle is about 60° to vertical.

5. The powder dispenser according to claim 1, wherein said cavity includes a substantially conically shaped hopper having said dispensing opening at a lower open end thereof.

6. The powder dispenser according to claim 1, further comprising a slider housing secured to said dispenser housing for slidably supporting said slider between said feed position and said dispense position, said slider housing including an outlet opening between said gas supply bore and said outlet supply tube.

7. The powder dispenser according to claim 6, wherein said slider housing includes a vent opening in alignment with said dispensing opening, and further comprising a mesh insert in said vent opening have mesh openings that permit escape of gas therethrough but which prevent the escape of powder therethrough.

8. The powder dispenser according to claim 7, wherein said mesh insert includes a mesh plug having a through bore, and a mesh sheet mounted to said mesh plug in covering relation to said through bore, with said mesh plug being positioned in said vent opening.

9. The powder dispenser according to claim 6, further comprising a first gasket positioned between said dispenser housing and said slider, and a second gasket positioned between said slider and said slider housing to prevent escape of powder.

10. The powder dispenser according to claim 6, wherein said slider includes a recess facing said slider housing and a vacuum passage in fluid communication with said recess for applying a vacuum to said recess to remove powder on said slider housing.

11. The powder dispenser according to claim 1, wherein said cavity includes a supply opening for supplying new powder to said cavity, and further comprising a removable cap secured to said supply opening, said arrangement being provided in said removable cap.

12. A method for dispensing predetermined amounts of powder from a powder dispenser, said method comprising the steps of:

providing powder to be dispensed in a cavity of a dispenser housing which has a dispensing opening for the cavity;

moving a slider to a feed position relative to the dispenser housing such that a holding member of the slider which has pores that permit passage of a gas therethrough but which prevent passage of the powder therethrough is supplied with powder from said dispensing opening for said cavity to said holding member;

providing the following cycle of steps at least once until the holding member is precisely filled with a predetermined amount of the powder:

supplying a pressurized gas to said cavity to aid in delivery of the powder from said cavity to said holding member;

stopping the supply of the pressurized gas to said cavity;

applying a vacuum through a vacuum passage in fluid communication with an outer wall of said holding member to remove gas trapped by said powder through said holding member;

moving the slider to a dispense position relative to the dispenser housing such that the holding member of the slider is positioned over an outlet supply tube fixed relative to the dispenser housing; and supplying a pressurized gas to the receptacle portion through a gas supply bore in said dispenser housing so as to force the powder from said receptacle portion to said outlet supply tube.

13. The method according to claim 12, wherein said step of supplying a pressurized gas includes the step of supplying the pressurized gas at an angle to said cavity to cause swirling of the powder in said cavity.

14. The method according to claim 13, wherein the angle is about 60° to vertical.

15. The method according to claim 12, wherein there is provided a slider housing secured to said dispenser housing for slidably supporting said slider between said feed position and said dispense position, said slider housing including an outlet opening between said gas supply bore and said outlet supply tube and a vent opening in alignment with said dispensing opening, and further comprising the step of venting said holding member through a mesh insert in said vent opening of said slider housing.

16. The method according to claim 15, further comprising the step of cleaning an area between said slider and said slider housing by applying a vacuum when said slider is moved to said dispense position.

17. The method according to claim 15, further comprising the step of cleaning an area between said slider and said dispenser housing by applying a vacuum when said slider is moved to said dispense position.

18. The method according to claim 12, further comprising the step of applying a vacuum to said cavity to de-agglomerate the powder in the cavity when said supply of pressurized gas to the cavity is stopped.

* * * * *